United States Patent
Lyon

(10) Patent No.: US 8,446,796 B2
(45) Date of Patent: May 21, 2013

(54) METHOD AND SYSTEM FOR PROCESSING ECHO SIGNALS

(75) Inventor: George Quinton Lyon, Peterborough (CA)

(73) Assignee: Siemens Aktiengesellschaft, München (DE)

( * ) Notice: Subject to any disclaimer, the term of this patent is extended or adjusted under 35 U.S.C. 154(b) by 298 days.

(21) Appl. No.: 12/506,335

(22) Filed: Jul. 21, 2009

(65) Prior Publication Data
US 2010/0017174 A1  Jan. 21, 2010

(30) Foreign Application Priority Data
Jul. 21, 2008 (EP) .................................. 08013102

(51) Int. Cl.
*G01S 15/02* (2006.01)
(52) U.S. Cl.
USPC .............................. 367/88; 367/908
(58) Field of Classification Search
USPC ....................................................... 367/908
See application file for complete search history.

(56) References Cited

U.S. PATENT DOCUMENTS

| | | | | |
|---|---|---|---|---|
| 4,901,245 A * | 2/1990 | Olson et al. .................. 702/54 |
| 5,793,705 A * | 8/1998 | Gazis et al. .................. 367/98 |
| 5,946,967 A * | 9/1999 | Russell ........................ 73/290 R |
| 6,047,602 A * | 4/2000 | Lynnworth .................. 73/632 |
| 6,330,831 B1 * | 12/2001 | Lynnworth et al. ......... 73/861.28 |
| 6,347,552 B1 * | 2/2002 | Purpura et al. ............... 73/633 |
| 2005/0072226 A1 * | 4/2005 | Pappas et al. ............... 73/290 V |
| 2005/0178198 A1 * | 8/2005 | Freger et al. ................ 73/290 V |
| 2006/0027021 A1 * | 2/2006 | Choi et al. .................. 73/579 |
| 2007/0068248 A1 * | 3/2007 | Freger et al. ................ 73/290 V |
| 2007/0165488 A1 * | 7/2007 | Wildey ....................... 367/101 |
| 2008/0047329 A1 * | 2/2008 | Breed ......................... 73/61.41 |
| 2008/0236275 A1 * | 10/2008 | Breed et al. ................ 73/290 V |

FOREIGN PATENT DOCUMENTS

| | | |
|---|---|---|
| DE | 10142538 A1 | 2/2004 |
| DE | 102004051999 A1 | 4/2006 |
| EP | 1 912 078 A1 | 4/2008 |

OTHER PUBLICATIONS

Peter Hauptmann, Niels Hoppe and Alf Puttmer; "Application of ultrasonic sensors in the process industry". 2002 Meas. Sci. Technol. vol. 13, No. 8. Aug. 2002.*

Andria, G.; Attivissimo, F.; Lanzolla, A.; , "Digital measuring techniques for high accuracy ultrasonic sensor application," Instrumentation and Measurement Technology Conference, 1998. IMTC/98. Conference Proceedings. IEEE , vol. 2, No., pp. 1056-1061 vol. 2, May 18-21, 1998.*

* cited by examiner

*Primary Examiner* — Isam Alsomiri
*Assistant Examiner* — James Hulka

(57) ABSTRACT

In a pulse-echo measuring system, echo signals are compared by a difference calculator with the output of a model simulating the system. The detected differences are used to re-calculate parameters in the model. Other parameters are directly measured and applied to the model. A primary measurement, such as level, is detected more accurately and other parameters such as froth height and turbulence are estimated accurately.

9 Claims, 1 Drawing Sheet

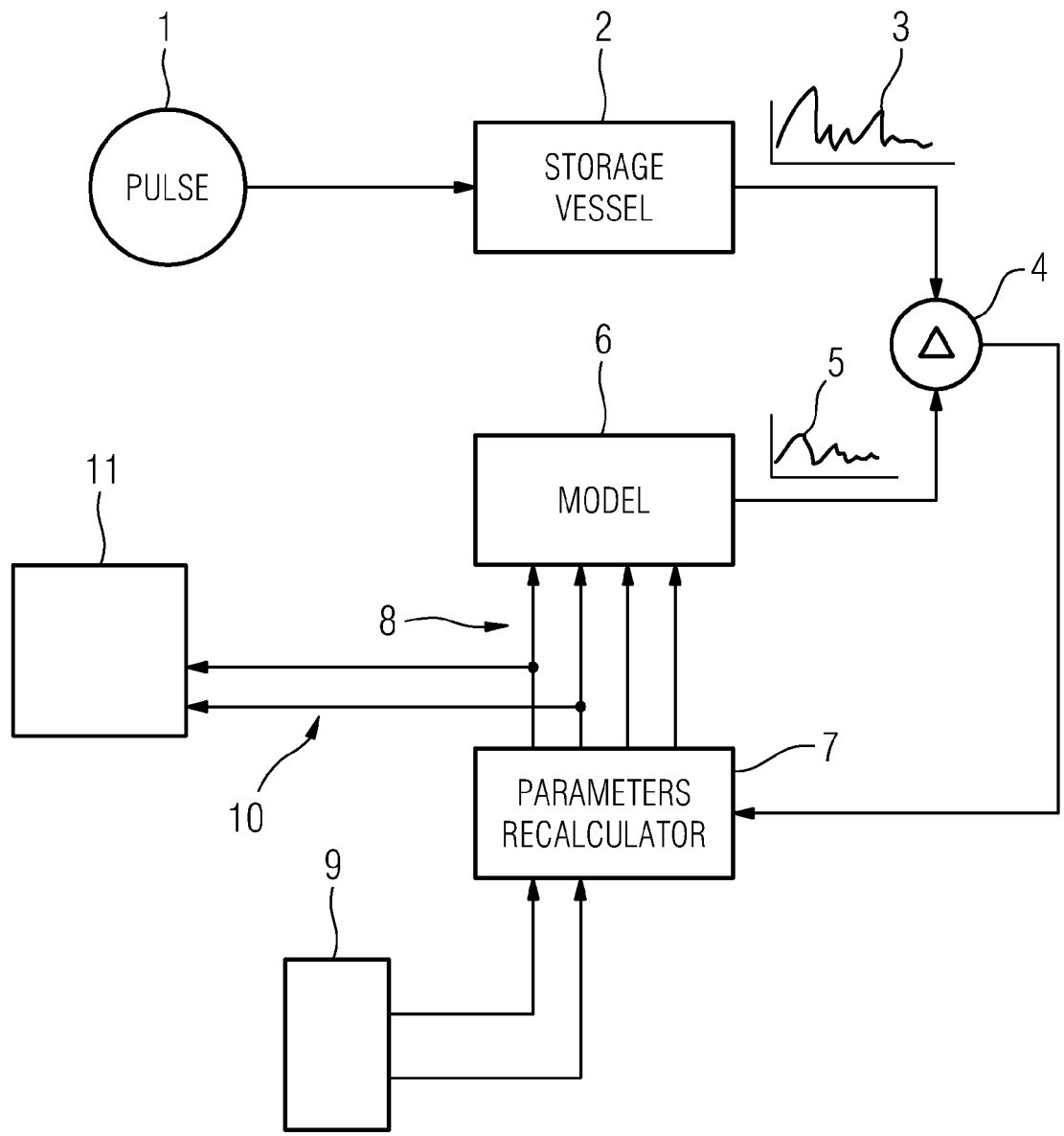

METHOD AND SYSTEM FOR PROCESSING ECHO SIGNALS

CROSS REFERENCE TO RELATED APPLICATIONS

This application claims priority of European Patent Office Application No. 08013102.2 EP filed Jul. 21, 2008, which is incorporated by reference herein in its entirety.

FIELD OF INVENTION

This invention relates to processing of echo signals in pulse-echo measurement systems. The invention is particularly applicable to level measurement systems for industrial process control using either radar or ultrasonic pulses, but may also be used in other forms of pulse-echo measurement.

BACKGROUND OF INVENTION

In a measurement system of this type, the measured data needs to be extensively processed to extract the relevant part of the echo profile from interference. This can lead to unreliable and inaccurate level measurement as the vessel environment changes. It is known to process the received information according to a set of parameters related to vessel conditions, but at present such parameters are adjusted during a setup procedure, and are chosen to be a compromise aimed at reliable operation in the worst environment likely to be encountered.

It will be appreciated that in a typical installation there are environmental parameters which can readily be measured and therefore applied in real time as an actual parameter; one example of this is the temperature of the material of interest. However, there are other relevant parameters which are difficult or impossible to measure and apply to the signal processing algorithm in real time. Examples of the latter are turbulence, froth height and froth density.

SUMMARY OF INVENTION

One object of the present invention is to provide a method and apparatus for processing echo profiles in which a primary variable such as level is more accurately derived. Another object is to allow relevant parameters to be derived which are difficult or impossible to measure directly.

Accordingly, the present invention provides a method of processing echo signals in a pulse-echo measurement system, comprising:
providing a model of the measurement environment, the model being responsive to a number of parameters related to the measurement environment;
comparing each echo signal as received with a signal calculated by the model to derive a difference signal;
using said difference signal to recalculate one or more of said parameters and apply the recalculated parameter or parameters to the model; and
providing at least one of the recalculated parameters as an output measurement.

The method of the invention reduces false measurements and allows the monitoring of parameters which are difficult or impossible to measure directly.

The model preferably includes a separate component model for each parameter.

In preferred embodiments of the invention, one or more of said parameters is not directly measured by the measurement system, and one or more other parameters is physically measured, such parameters being applied to the model without undergoing recalculation. In this way, the method can provide accurate values for parameters which are difficult or impossible to measure directly.

Typically, the method is used in measuring the level of a material within a vessel, and the parameters not directly measured comprise one or more of material particle size, surface turbulence, angle of repose, froth height, froth density, material absorption of interrogating signal, false reflections, or environmental noise.

The invention from another aspect provides a pulse-echo measurement system including means for repetitively transmitting pulse energy towards a target, means for receiving reflected pulses to form an echo profile signal, and signal processing means operable to derive one or more desired measurements from the echo profile;
the signal processing means including:
a model of the measurement environment, the model being responsive to a number of parameters related to the measurement environment; the model being operable to compare each echo signal as received with a signal calculated by the model to derive a difference signal;
recalculation means operable in response to said difference signal to recalculate one or more of said parameters and apply the recalculated parameter or parameters to the model; and to provide at least one of the recalculated parameters as an output measurement.

BRIEF DESCRIPTION OF THE DRAWINGS

An embodiment of the present invention will now be described, by way of example only, with reference to the drawings, in which:

FIG. 1 is a block diagram illustrating one embodiment of the invention.

DETAILED DESCRIPTION OF INVENTION

Referring to FIG. 1, a radar or ultrasonic transducer 1 transmits an interrogating pulse into a storage vessel 2. A captured echo signal 3 is applied to a difference calculator 4 where the signal 3 is compared with a calculated signal 5.

The calculated signal 5 is produced by a simulated model 6 of the storage tank 2. The model 6, as discussed in more detail below, contains a number of parameters such as:
Rate of change of level
Material particle size
Surface turbulence
Angle of repose
Froth height
Froth density
Material absorption of interrogating signal
False reflections
Environmental noise
all of which are difficult or impossible to measure directly. The output of the difference calculator 5 is applied to a parameter recalculator 7 which modifies the parameters 8 used in the model 6 in a manner to reduce the difference.

Any one or more of the parameters 8 may be used, as required, as a final output 10 from the system, and can be used at 11 to provide a display and/or as a process control input.

The model 6 includes plant parameters 9 which can be readily measured, such as agitator speed or feed rate. Thus, actual values for these parameters 9 can be included in the model 6 and need not be part of the parameter recalculation.

The model 6 may be any suitable model which models the most significant processes within the storage vessel 2. Typically, the model 5 will consist of several individual component models, each referring to a given process. The component models can be mechanistic, qualitative or statistical. The derivation of particular process models is not part of the present invention as various forms will be apparent to those skilled in the art. The process models can be generated analytically, or empirically from measurements of the plant to which the system is to be applied.

As one example of the invention as applied to a stirred tank, the echo profile mostly does not include the reflection of the agitator, but the model detects this reflection every few minutes. After identifying the rate of rotation of the agitator, the model reliably includes an agitator reflection in the profile and if the agitator signal changes, the rate of appearance of the agitator in the profile is adjusted accordingly. To examine this example in more detail, every time the beam is interrupted by the agitator the measurement is disturbed, and a classical linear model would be unable to cope. The model includes a component model for the stirrer with the variables target strength, position (distance from sensor), and frequency of interruption. As the model receives these interruptions, it adapts the received signal to include the agitator signal. The model is no longer disturbed by the appearance of the agitator and the level measurement will remain accurate and reliable.

It will be appreciated that the invention is based on the use of a model whose parameters are adjusted, based on recent measurements, and thus operates a form of corrective feedback.

The invention allows the primary variable, for example the level measurement, to be determined more accurately or reliable, because previously ignored parameters are now used. By accounting for the variable processes their effect is diminished, leaving only the uncluttered primary measurement. The invention also allows the determination of useful parameters which were previously unknown. These parameters, for example froth height, can be used by the plant control system.

Other parameters can be incorporated according to the degree of sophistication required and the features of particular interest. For example, dielectric constant would allow the model to know how many reflections are to be expected and where the bottom reflection would be; and type of material would define anticipated target strength and angle of repose. The model can now be interrogated to give outputs such as angle of repose, surface turbulence, or whatever else the user might find useful.

The invention claimed is:

1. A method of processing signals in a pulse-echo measurement system, comprising:
   repetitively transmitting pulse energy towards a target, wherein the target lies in a plant and has a measurement environment in the plant, wherein the measurement environment in the plant comprises a vessel containing a material, wherein a surface of the material is the target;
   for each pulse energy transmission, receiving reflected pulses in order to form echo signals;
   processing the echo signals to derive one or more desired measurements from the echo signals via a signal processor by:
      providing a model of the measurement environment, wherein the model includes component models related to a plurality of parameters related to the measurement environment, wherein at least one of the plurality of parameters is unknown and pre-estimated, and wherein the model is designed to calculate a modeled echo profile on the basis of the plurality of parameters;
      comparing, via a difference calculator, each echo signal obtained from the measurements with the modeled echo profile calculated by the model to derive difference signals resulting from a difference in one or more of the plurality of parameters between the measurement environment and the model of the measurement environment;
      adjusting one or more of the unknown and pre-estimated parameters based upon the difference signals via a parameter re-calculator in a manner to minimize a difference;
      inputting the one or more adjusted parameters as feedback signals into the model of the measurement environment
         to modify the plurality of parameters used in the model, and
         to adapt the modeled echo profile to account for the difference; and
   providing at least one of the one or more adjusted parameters as a final output of the pulse-echo measurement system, wherein the at least one of the one or more adjusted parameter comprises a level of the material in the vessel.

2. The method according to claim 1, wherein the model includes a separate component model for each parameter.

3. The method according to claim 1, wherein one or more parameters are physically measured and applied to the model without undergoing recalculation.

4. The method according to claim 3, wherein the one or more measured parameters comprise one or more of temperature, agitator speed, and feed rate.

5. The method according to claim 3, wherein the one or more adjusted parameters comprise material particle size, surface turbulence, angle of repose, froth height, froth density, material absorption of interrogating signal, false reflections, and environmental noise.

6. A pulse-echo measurement system, comprising:
   a device for repetitively transmitting pulse energy towards a target, wherein the target lies in a plant and has a measurement environment, wherein the measurement environment in the plant comprises a vessel containing a material, wherein a surface of the material is the target;
   a device for receiving reflected pulses from each pulse energy transmission in order to form echo signals;
   a signal processing device configured to derive one or more desired measurements from the echo signals, wherein the signal processing device is configured to
      provide a model of the measurement environment, wherein the model includes component models related to a plurality of parameters related to the measurement environment, wherein at least one of the plurality of parameters is unknown and pre-estimated, and wherein the model is designed to calculate a modeled echo profile on the basis of the plurality of parameters;
      compare, via a difference calculator, each echo signal obtained from the measurements with the modeled echo profile calculated by the model to derive difference signals resulting from a difference in one or more of the plurality of parameters between the measurement environment and the model of the measurement environment;
      adjust one or more of the unknown and pre-estimated parameters based upon the difference signals via a parameter re-calculator in a manner to minimize a difference;

input the one or more adjusted parameters as feedback signals into the model of the measurement environment
to modify the plurality of parameters used in the model, and
to adapt the modeled echo profile to account for the difference; and
provide at least one of the one or more adjusted parameters as a final output of the pulse-echo measurement system, wherein the at least one of the one or more adjusted parameters comprises a level of the material in the vessel.

7. The system according to claim 6, wherein the model includes a separate component model for each parameter.

8. The system according to claim 6, wherein the one or more adjusted parameters comprise one or more of material particle size, surface turbulence, angle of repose, froth height, froth density, material absorption of interrogating signal, false reflections, and environmental noise.

9. The system according to claim 6, further comprising:
a sensor for directly measuring one or more parameters comprising one or more of temperature, agitator speed, and feed rate.

\* \* \* \* \*